(12) United States Patent
Dwork

(10) Patent No.: US 6,717,941 B1
(45) Date of Patent: Apr. 6, 2004

(54) METHOD AND APPARATUS FOR EARLY TERMINATION OF FRAME DATA

(75) Inventor: Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/495,934

(22) Filed: Feb. 2, 2000

Related U.S. Application Data
(60) Provisional application No. 60/169,269, filed on Dec. 7, 1999.

(51) Int. Cl.$^7$ .................. H04L 12/413; G06F 13/00
(52) U.S. Cl. .................. 370/381; 370/445; 370/463; 710/32; 710/129
(58) Field of Search ................ 370/357, 360, 370/381, 463, 517, 445; 709/249, 250; 710/22, 23, 29, 30, 32, 52, 56, 129, 130; 711/105, 106

(56) References Cited

U.S. PATENT DOCUMENTS

| | | | | |
|---|---|---|---|---|
| 5,299,313 A | * | 3/1994 | Petersen et al. | 395/200 |
| 6,145,016 A | * | 11/2000 | Lai et al. | 710/4 |
| 6,161,160 A | * | 12/2000 | Niu et al. | 710/129 |
| 6,178,462 B1 | * | 1/2001 | Bass et al. | 709/249 |
| 6,247,089 B1 | * | 6/2001 | Kuo et al. | 710/129 |
| 6,516,371 B1 | * | 2/2003 | Lai et al. | 710/129 |

OTHER PUBLICATIONS

"Technique for Cyclic Redundancy Check Modification Useful in Certain Data Networks", IBM Technical Disclosure Bulletin, Jun. 1994, US, vol. 37, Issue 6B, pp. 267–272.*

* cited by examiner

*Primary Examiner*—Alpus H. Hsu

(57) ABSTRACT

A method and apparatus for the early termination or deletion of frame data that is being transmitted or is scheduled for transmission from one network station to another network station. A network interface in the transmitting network station is able to read and transmit frame data as a central processing unit in the transmitting network is writing frame data into memory. The network interface reads a descriptor associated with frame data to determine if the frame data, which is either being transmitted or is scheduled for transmission, has a termination field indicating that the frame data is to be deleted. A descriptor management unit in the network interface reads the termination field in the descriptor and determines whether the frame data is currently being sent or is scheduled for transmission. If the frame data is scheduled for transmission, then the frame data is flushed from the data memory of the transmitting network station. If the frame data is currently being sent, then an inverted frame check sequence is appended to the frame data by the network interface. The inverted frame check sequence ensures that the network interface in the network station receiving the frame data deletes the frame data from the network station's data memory.

11 Claims, 5 Drawing Sheets

| Figure 1A |
| Figure 1B |

METHOD AND APPARATUS FOR EARLY TERMINATION OF FRAME DATA

RELATED APPLICATIONS

This application claims priority from Provisional Application Ser. No. 60/169,269, filed Dec. 7, 1999, which is incorporated herein by reference.

TECHNICAL FIELD

The present invention relates to a method and apparatus for the early termination of frame data, and more specifically for deleting frame data from data memory when the frame data has not been transmitted from a transmitting network station or causing the deletion of the frame data from the memory of the receiving network station.

BACKGROUND ART

Network interfaces handle the transmission and reception of frame data between a transmitting network station and a receiving network station via a network communications system, such as a local area network. For transmission, frame data is sent from an upper layer down through a driver layer, a media access controller layer and then to a physical layer. In the transmitting network station, a central processor unit writes frame data and associated descriptors into system memory where a network interface reads the frame data and transmits the frame data onto the network. At the receiving network station a network interface stores the frame data into memory.

Typically, the central processor unit in the transmitting network station writes all of the information, i.e., frame data and associated descriptors, into system memory, and the network interface subsequently reads and writes all of that information into data memory. Once all of the information is written into data memory, the network interface starts to read and transmit the data frames. Reading and writing all of the information first into the system memory and subsequently into data memory requires a large amount of time. The larger the amount of information there is, the larger the amount of time required to transmit the information. In order to shorten this time, a media access controller in the network interface could read the stored information in the data memory before all of the information can be written in the data memory. However, because the network interface is unable to delete frame data that is in the process of being read or transmitted, the media access controller in the network interface cannot start to read the stored information before the central processing unit as finished writing the information into system memory.

SUMMARY OF THE INVENTION

There is a need for a media access controller in a network interface of a transmitting network station which has the ability to start to read frame data before all of the frame data is written into system memory.

There is also a need for a network interface in a transmitting network interface to have the ability to delete frame data that is read from data memory.

There is also a need for a network interface in a transmitting network interface to have the ability to cause the deletion of frame data being transmitted to another network interface.

These and other needs are attained by the present invention, where a network interface in a transmitting network station is able to delete frame data in data memory when the transmission of the frame data has not begun and is able to cause a receiving network interface to delete the frame data if the transmission of the frame data has begun.

According to one aspect of the present invention, a network interface comprising a data memory configured for storing at least one frame data, a media access controller (MAC) configured for transmitting a selected frame data in the data memory, a memory controller configured for determining the status of the selected frame data, and a descriptor management unit are used to delete frame data. The descriptor management unit is configured for reading and interpreting a descriptor associated with the selected frame data and contains a termination field containing information indicating if the selected frame data is to be deleted. The descriptor management unit is further configured to cause the MAC to append an inverted frame check sequence to the selected frame data when the selected frame data is to be deleted and transmission of data has already been initiated by the MAC or delete the selected frame data from the data memory when the transmission of the selected frame data has not been initiated and the selected frame data is to be deleted. The ability to delete the frame data allows the MAC in the network interface of the transmitting network station to initiate reading the frame data from the data memory before the central processing unit has written all of the frame data and associated descriptors into system memory.

Another aspect of the present invention provides a method for terminating a transmission of a selected frame in a network interface. The method comprises the steps of reading information in a termination field of a descriptor associated with a selected frame data, determining the status of the selected frame data and deleting the selected frame data when the termination field information in the descriptor for the associated selected frame data indicates the selected frame data is to be deleted and the status of the selected frame indicates that the selected frame data is scheduled for transmission. The method also includes the step of appending an inverted frame check sequence to the selected frame data when the termination field information indicates the selected frame data is to be deleted and the status of the selected frame indicates that the selected frame data is being transmitted. The ability to delete or cause the deletion of frame data by a network interface regardless of whether or not the transmitting network station has started the transmission of the frame data allows the network interface to respond to errors in a more efficient manner.

Another aspect of the present invention provides a network arrangement comprising a first station and a second station having network interfaces to delete selected frame data. The first station has a network interface comprising a first media access controller (MAC) configured for transmitting selected frame data, a descriptor management unit configured for reading and interpreting a descriptor associated with the selected frame data and containing a termination field containing information indicating if the selected frame data is to be deleted, and further configured to cause the first MAC to append an inverted frame check sequence to the selected frame data when the selected frame data is to be deleted and transmission of data has already been initiated by the first MAC, or delete the selected frame data from the data memory when the transmission of the selected frame data has not been initiated and the selected frame data is to be deleted. The second station has a network interface containing a second MAC configured for responding to receipt of the selected frame data with an appended inverted frame check sequence from the first station by deleting the received selected frame data. The ability to append the inverted frame check sequence allows the network interface to read the frame data while a central processing unit is writing frame data into system memory.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention is described in the context of an IEEE 802.3 compliant network interface configured for sending and receiving data packets between a system memory and a network medium using established Media Access Control (MAC) and Physical Layer (PHY) protocols. An overview will first be provided of the network interface, followed by a description of the arrangement for deleting a selected frame data from data memory when the MAC has not started to transmit the selected frame data and causing the deletion of the selected frame data when the MAC has started to transmit the selected frame data.

NETWORK INTERFACE OVERVIEW

Figures 1, 1A:
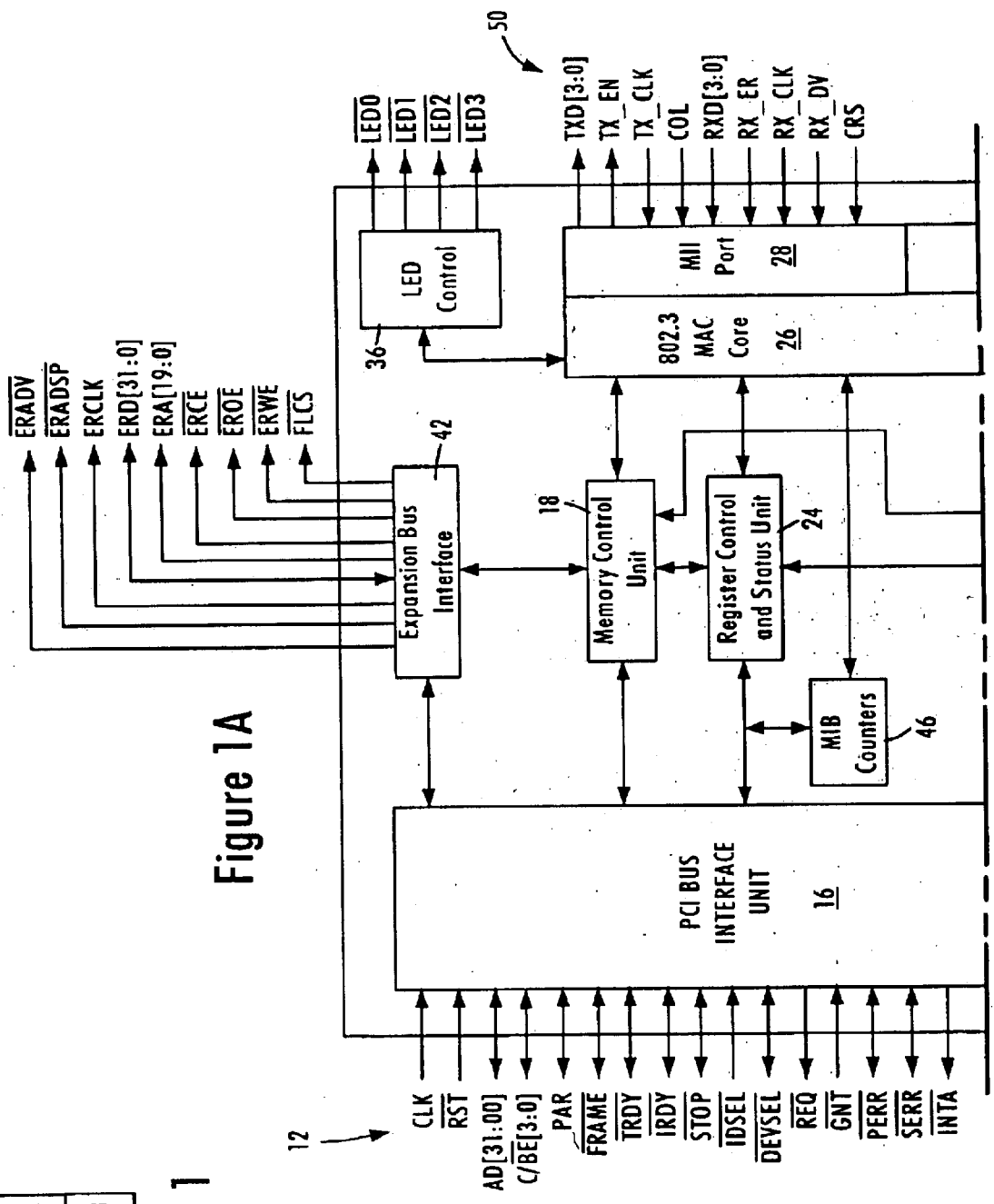
FIG. 1 is a block diagram of an exemplary network interface that accesses the media of an Ethernet network according to an embodiment of the present invention.
Figure 1B:
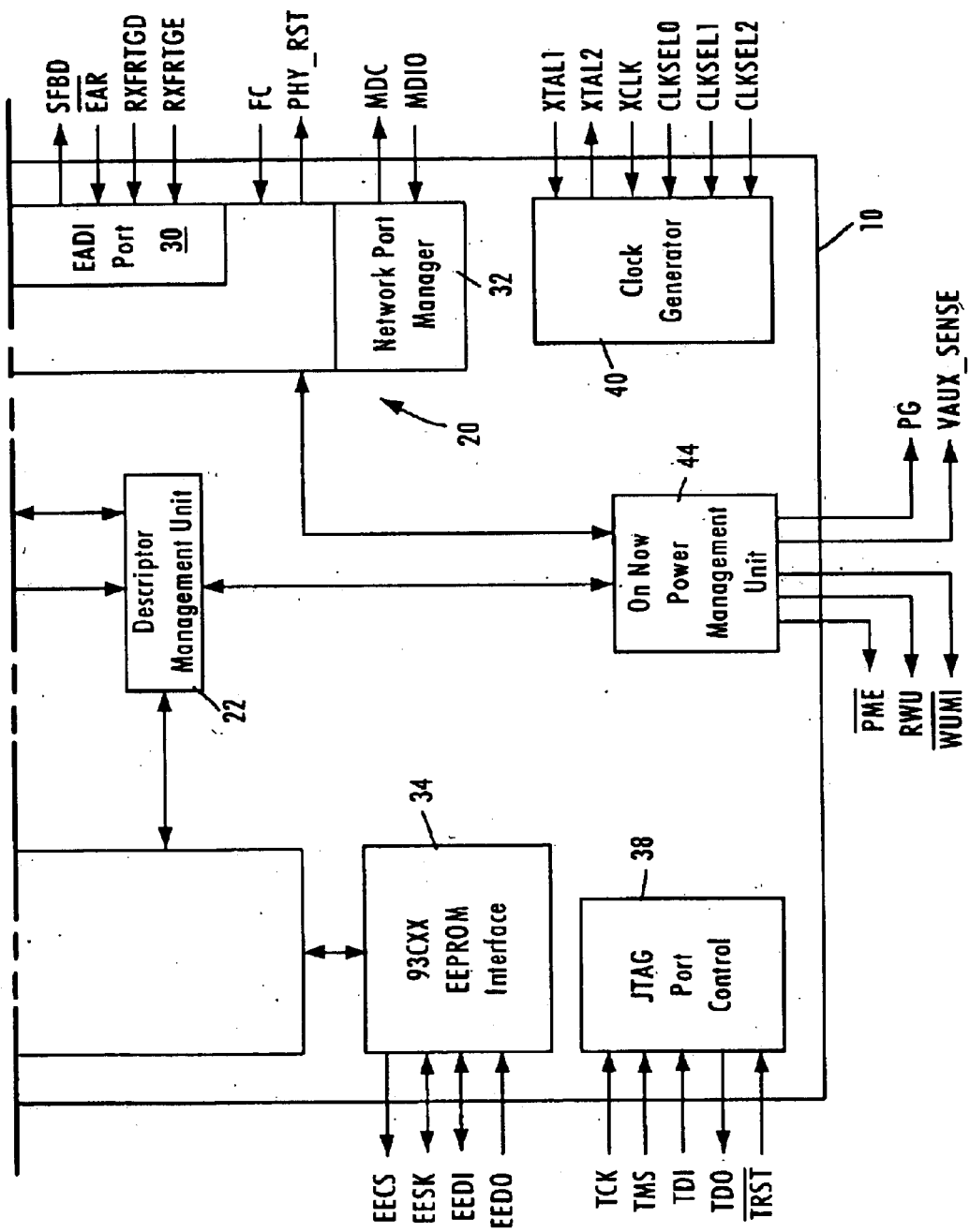

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
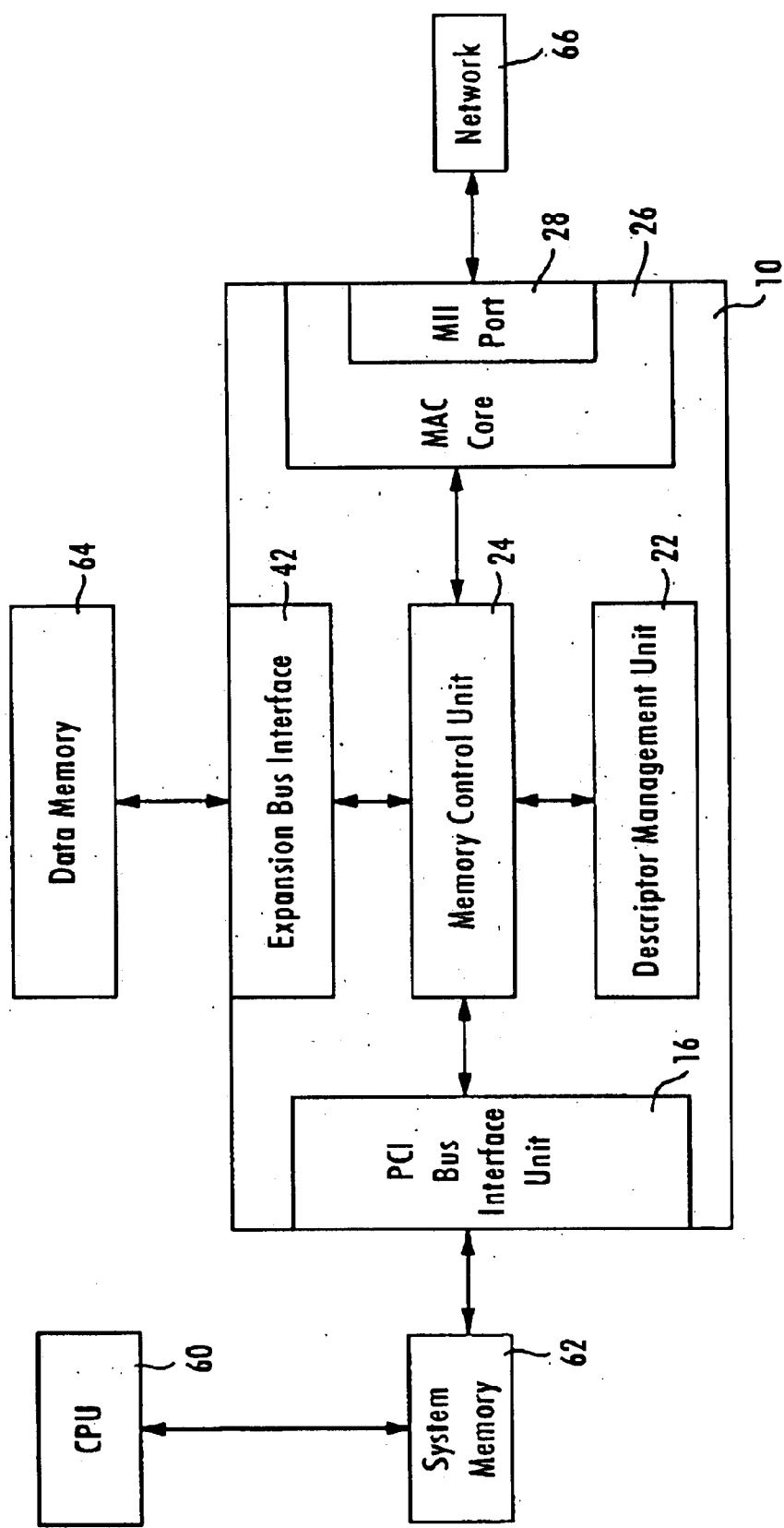
FIG. 2 is a block diagram of an exemplary arrangement of network interfaces according to an embodiment of the present invention.

FIG. 2 is a block diagram of an exemplary arrangement of a network interface according to an embodiment of the present invention. Only certain features of the network interface 10 from the depiction of FIG. 1 are repeated in FIG. 2, so as to better illustrate the transmission operation of the present invention. An application driver (not shown) instructs a central processing unit 60 to write frame data and associated descriptors into system memory 62. The memory control unit 24 of the network interface 10 uses the PCI bus interface unit 16 to read the frame data from the system memory 62 via a PCI bus. The memory control unit 24 writes the frame data and associated descriptors into data memory 64 via expansion bus interface 42. The frame data is then passed by the memory control unit 24 to the MAC 26 for transmission under the control of the descriptor management unit 22. While the descriptor management unit 22 reads and interprets a descriptor associated with the selected frame data, the MAC 26 can begin to transmit the frame data onto the network 66 via the MII port 28.

Figure 3:
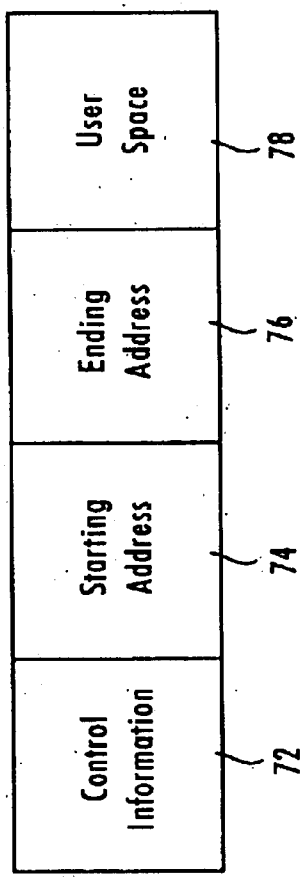
FIG. 3 is a diagram illustrating the contents of an exemplary descriptor used by the descriptor management unit to read frame data from system memory.

FIG. 3 is a diagram illustrating the contents of an exemplary descriptor used by the descriptor management unit to read frame data from system memory. The descriptor 70 includes such information as control information 72, starting address 74, ending address 76, and user space 78. The starting address 74 specifies where the descriptor management unit 22 can find the frame data in system memory 62. The ending address 76 specifies where the frame data ends in system memory 62.

The control information 72 includes information allowing the network interface 10 to control the transfer of the frame data over the PCI bus from system memory 62, as well as the termination field. The termination field is used to determine whether the frame data should be transmitted or deleted. The termination field can be a single bit or a plurality of bits. For example, if the termination field is a single bit, a "one" can indicate that the selected frame data is to be deleted and a "zero" can indicate that the selected frame data should not be deleted. The application driver in an upper protocol layer controls the termination field by writing the information in the termination field. The application driver can cause the deletion of the frame data for a variety of reasons including user task termination, fatal system errors, etc.

If the termination field of the descriptor indicates that the selected data frame should be deleted, then the current status of the frame data needs to be determined. The memory control unit 24 determines the status of the selected frame data, i.e., whether the selected frame data is being transmitted or is scheduled for transmission. This is accomplished by examining transmission status signals from the MAC 26. When the status indicates that the selected frame data has not been transmitted, then the memory control unit 24 flushes or deletes the selected frame data from the data memory 64. When the status indicates that the selected frame data is being transmitted, then the MAC 26 appends an inverted frame check sequence to the selected frame data. A network station configured according to the present invention, receiving frame data having an inverted frame check sequence will delete the frame data from the data memory of the receiving network station. Specifically, the MAC 26 of the receiving network interface will delete the frame data in response to recognition of the inverted frame check sequence.

Figure 4:
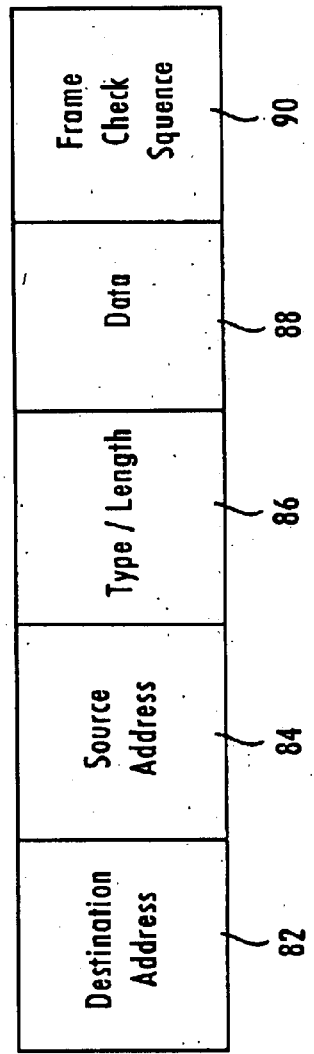
FIG. 4 is a diagram illustrating the contents of an exemplary frame data in accordance with the present invention.

FIG. 4 is a diagram illustrating the contents of exemplary frame data in accordance with the present invention. Frame data 80 includes the destination address 82, the source address 84, the type/length 86, the data 88, and the frame check sequence 90. The destination address 82 is the address of the receiving network station. The source address 84 is the address of the transmitting network station. The type/length 86 indicates the type and/or the length of the frame data. The frame check sequence is used to ensure that the frame data the receiving network station receives does not contain any errors.

Figure 5:
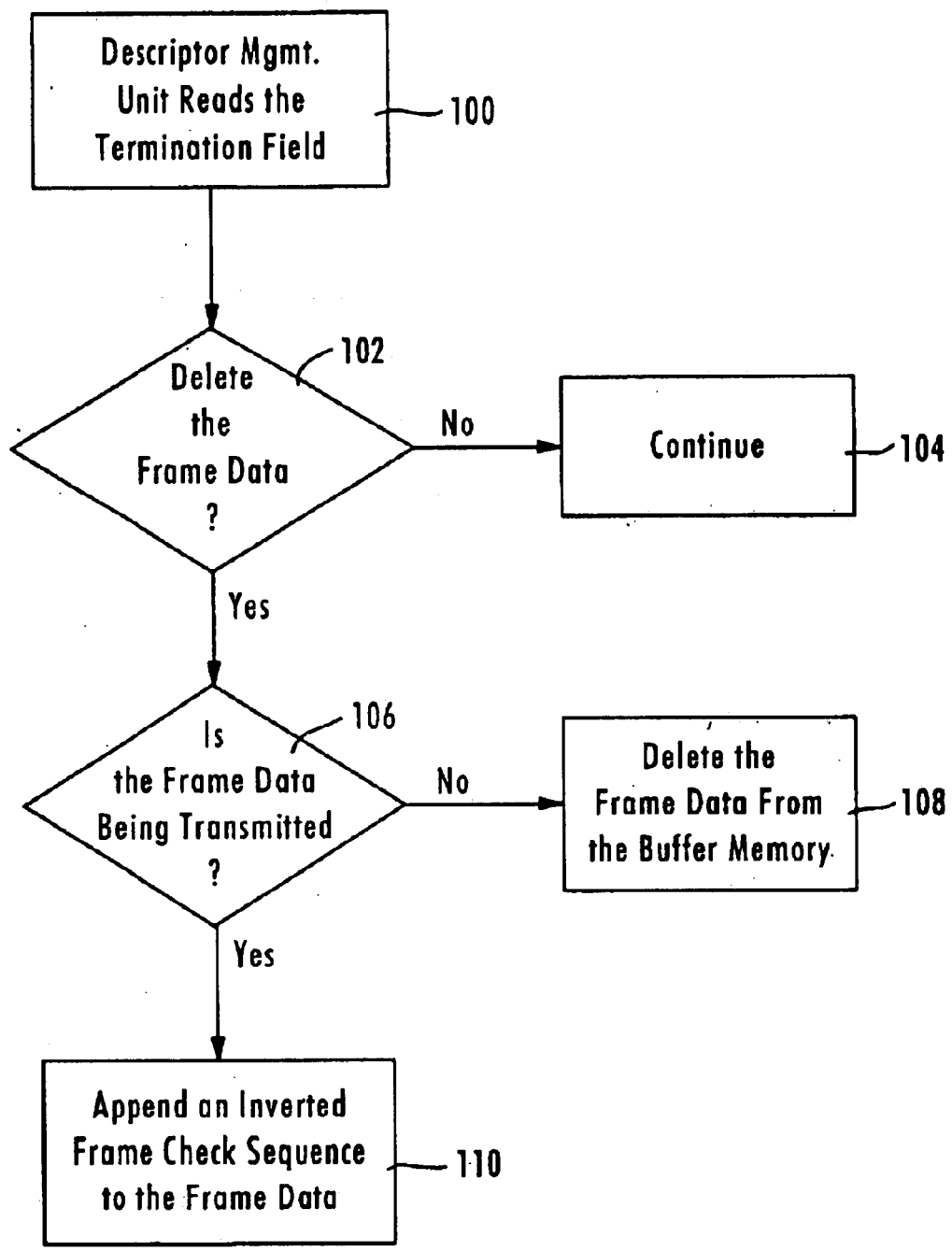
FIG. 5 is a flow chart of a method for terminating a transmission of a selected frame in a network interface in accordance with embodiments of the present invention.

FIG. 5 is a flow chart of a method for terminating a transmission of a selected frame in a network interface in accordance with embodiments of the present invention. The descriptor management unit 22 reads information in the termination field of the descriptor associated with the selected frame data at step 100, where the selected frame data and associated descriptor are stored in the data memory 64. From this information the descriptor management unit 22 determines if the selected frame data is to be deleted at step 102. If the information in the termination field of the descriptor indicates that the selected frame does not need to be deleted, then transmission of the selected frame continues at step 104. If the information in the termination field of the descriptor indicates that the selected frame needs to be deleted, then the method continues to step 106. The memory control unit 24 determines the status of the selected frame data, i.e., is the frame data currently being transmitted or is the selected frame data still scheduled to be transmitted at step 106. If the status of the selected frame data indicates that the selected frame data is scheduled to be transmitted, then the selected frame data is deleted from the data memory 64 at step 108. If the status of the selected frame data indicates the selected frame data has started to be transmitted, then the media access controller 26 appends an inverted frame check sequence to the selected frame data at step 110.

Upon receiving frame data with an inverted frame check sequence, a receiving station will discard the frame data. If the frame has not yet been sent, then the frame data can be deleted by the transmitting station before transmission on the network.

The present invention improves network speed by allowing a MAC to initiate reading the frame data from the data memory before the central processing unit has written all of the frame data and associated descriptors into the system memory. By the setting and examination of a termination field provided in an associated descriptor, frame data can be discarded altogether before transmission or caused to be discarded by the receiving station after transmission in an elegant manner.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

We claim:

1. A network interface comprising:
   a media access controller (MAC) configured for transmitting a selected frame data from data memory;
   a memory control unit configured for determining the status of the selected frame data;
   a descriptor management unit configured for reading and interpreting a descriptor associated with the selected frame data and containing a termination field containing information indicating if the selected frame data is to be deleted, and further configured to cause the MAC to append an inverted frame check sequence to the selected frame data when the selected frame data is to be deleted and transmission of data has already been initiated by the MAC, or delete the selected frame data from the data memory when the transmission of the selected frame data has not been initiated and the selected frame data is to be deleted, the inverted frame check sequence being an inversion of the frame check sequence that would be appended to the selected frame data when the selected frame data is not to be deleted.

2. The network interface of claim 1, wherein the media access controller is further configured to respond to receipt of a selected frame data with an appended inverted frame check sequence by deleting the received selected frame data.

3. The network interface of claim 1, further comprising an application driver that writes the information in the termination field.

4. The network interface of claim 1, wherein the termination field is a single bit.

5. A method for terminating a transmission of a selected frame in a network interface comprising:

reading information in a termination field of a descriptor associated with a selected frame data;

determining the status of the selected frame data;

deleting the selected frame data when the termination field information in the descriptor for the associated selected frame data indicates the selected frame data is to be deleted and the status of the selected frame indicates that the selected frame data is to be transmitted; and appending an inverted frame check sequence to the selected frame data when the termination field information indicates the selected frame data is to be deleted and the status of the selected frame indicates that the selected frame data is being transmitted, the inverted frame check sequence being an inversion of the frame check sequence that would be appended to the selected frame data when the selected frame data is not to be deleted.

6. The method of claim 5, wherein a descriptor control unit reads and interprets the termination field information in the descriptor.

7. The method of claim 5, wherein a memory control unit determines the status of the selected frame data.

8. The method of claim 5, wherein a data memory contains the selected frame data.

9. The method of claim 8, wherein a media access controller deletes the selected frame data from the data memory.

10. The method of claim 5, wherein a media access controller appends the inverted frame check sequence to the selected frame data.

11. A network arrangement comprising:

a first station having a network interface comprising:
a first media access controller (MAC) configured for transmitting a selected frame data from a data memory;
a unit configured for determining the status of the selected frame data and for reading and interpreting a descriptor associated with the selected frame data and containing a termination field containing information indicating if the selected frame data is to be deleted, and further configured to cause the first MAC to append an inverted frame check sequence to the selected frame data when the selected frame data is to be deleted and transmission of data has already been initiated by the first MAC, or delete the selected frame data from the data memory when the transmission of the selected frame data has not been initiated and the selected frame data is to be deleted, the inverted frame check sequence being an inversion of the frame check sequence that would be appended to the selected frame data when the selected frame data is not to be deleted; and a second station having a network interface containing a second MAC configured for responding to receipt of the selected frame data with an appended inverted frame check sequence from the first station by deleting the received selected frame data.

* * * * *